Feb. 22, 1949. J. N. PEW, JR 2,462,670
SHIP OF MONOLITHIC STRUCTURE
Filed July 6, 1945 2 Sheets-Sheet 1

WITNESS:
Rob R Mitchel

INVENTOR
Joseph N. Pew, Jr.,
BY
Busser and Harding
ATTORNEYS.

Feb. 22, 1949.  J. N. PEW, JR  2,462,670
SHIP OF MONOLITHIC STRUCTURE
Filed July 6, 1945  2 Sheets-Sheet 2

WITNESS:
Rob N. Kitchel

INVENTOR
Joseph N. Pew, Jr.
Busser and Harding
ATTORNEYS

Patented Feb. 22, 1949

2,462,670

UNITED STATES PATENT OFFICE 2,462,670

SHIP OF MONOLITHIC STRUCTURE

Joseph N. Pew, Jr., Lower Merion Township, Montgomery County, Pa., assignor to Sun Oil Company, Philadelphia, Pa., a corporation of New Jersey Application July 6, 1945, Serial No. 603,480

9 Claims. (Cl. 114—79)

1

Heretofore ships of welded construction are designed and built as a monolithic structure. The advantages of welding over riveting, not only in the art of shipbuilding, but in certain other arts, are well understood and fully recognized. Nevertheless, the welded type of ship has one disadvantage which does not exist, or does not exist to the same degree, in the type of ship that comprises separate sections united by rivets; and it is the object of my invention to remedy this objection.

The disadvantage above mentioned, apparently inherent in any ship designed and built as a monolithic structure, is the tendency of any crack that may develop at any localized region to spread to an indefinite extent. In existing structures of this character, multiaxial stresses distribute themselves over the entire section, thereby causing the section to crack with practically no reduction in area and without manifesting any appreciable ductility. Under certain abnormal operational conditions, there is danger of developing a fatigue or other type of crack which may extend itself so rapidly or in such degree as to render the ship unsafe to operate or to reach port under load. In extreme cases, there is an appreciable danger that the ship may be fractured into segments.

Perhaps equally dangerous are cracks that may arise from imperfections due to the presence of segregation, mechanical notches, scratches, etc., in the plates, or to uneven weld overlap, incomplete weld penetration, slag inclusions, misalignment, etc. Residual stresses due to welding may also cause development of cracks during either the construction or operation of the ship.

To whatever cause the existence or development of localized cracks may be due, they are more dangerous in a ship of welded construction. Due to the monolithic structure of such a ship, the plates and welds are often subjected to multiaxial stresses, causing the cracks to extend themselves, in some cases spontaneously, and tear into the entire transverse and other sections of the ship; the welded joints opposing no obstacle to the extension of the crack.

The object of my invention is to provide means whereby, regardless of the cause or character of an originally localized crack, it may be maintained localized, or its extension may be confined within safe limits, or it may be diverted in a direction that would create no dangerous condition. To this end I have modified the design of the ship by incorporating into, or applying to, the shell structure especially designed

2 sections accomplishing the above stated purpose. A number of specific embodiments of the invention are illustrated in the accompanying drawings, in which—

All of these embodiments are characterized by the provision of spaced apart special sections which form parts of the shell, or which may be applied to the shell, and which may extend in any direction but which it is important should extend in a direction longitudinal of the ship and which impose an effective bar to the extension through and beyond it of any crack that may develop in the main shell of the ship between the special sections. Each of these various embodiments comprises a plurality of metal members (one of which may or may not be a section of the monolithic shell), one or more of which (other than a section of the monolithic shell) is or are so disposed as to effectually resist tearing or shearing stresses and which constitute a bar to the extension of the crack through and beyond the special section. In the preferred embodiments of the invention, the structure is characterized by one or more separate or independent members (one of which may be a section of the monolithic shell) that is or are integrally joined, but not fused, to a section of the monolithic shell so as to form such tight mechanical bond therewith as to be immovable relative thereto and which is or are so disposed relative to the section of the monolithic shell as to effectually resist tearing or shearing stresses and thus constitute a bar to the extension of the crack through and beyond the section of the monolithic shell constituting part of the special section. It is important that such independent member should not be fused to a section of the monolithic shell, since in such case such stresses would be transmitted to said member or members.

Figure 1:
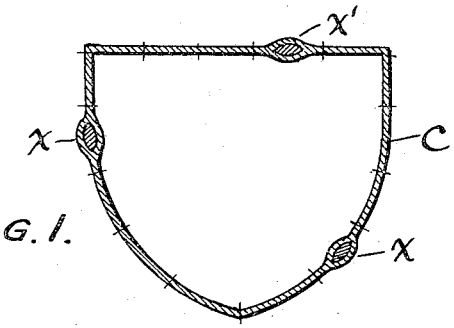
Fig. 1 is a diagrammatic cross-section through the hull and deck of a ship containing several of the special shell sections.
Figure 2:
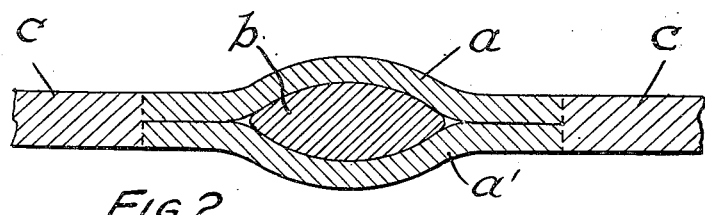
Figs. 2, 3, 4 and 5 are cross-sections through special sections, showing different embodiments of the invention.

In Fig. 2 each special section comprises two metal plates or strips $a$ and $a'$ having a combined thickness preferably equal to the thickness of the plates forming the main shell of the ship, said strips being spread apart between their edges to receive between them a longitudinally extending bar $b$, which may be, in cross-section, of the elliptical shape shown or may have any other practicable cross-sectional contour. The bar $b$ is not fused with the plates $a$ and $a'$, but is so mechanically bonded thereto as to be immovable relative thereto in every direction and especially in the direction of its longitudinal extension. In stating that the bar is "mechanically bonded" to the plates, I mean that the bar is held in rigid relationship to the plates without such actual fusion thereto as would convert the plates and bars into an integral structure. The longitudinal edges of this special section may be welded to plates $c$ that constitute part of the main shell of the ship and the strips $a$ and $a'$ may be considered to be a section of the monolithic main shell. By the main shell I mean to include at least the hull and desirably also the deck. These special sections extend, as above stated, longitudinally of the ship. The bar $b$ effectually resists the transmission through the special section of any crack in one of the sections $c$ to the other section $c$. Fig. 1 is a diagrammatic sectional view of the shell of the ship with two special sections $x$, like that shown in Fig. 2 (or like that shown in any of the other Figures 3–12) incorporated in the hull and one special section $x'$ incorporated in the deck; although, of course, these sections may be of any number and occupy any desirable relative location.

Figure 3:
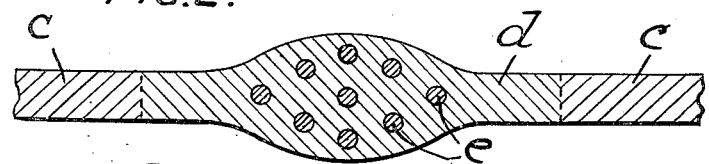

In Fig. 3 the special section may be a single plate or strip $d$ of a thickness adjacent its longitudinal edges corresponding to the thickness of the main shell $c$ but of greater thickness along its longitudinal center. In its central part are embedded a multiplicity of independent bars or rods $e$.

Figure 4:
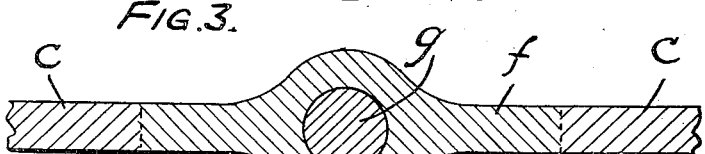

Figure 4 is similar to Fig. 3 except that the expanded central part $f$ may be hollowed out to receive, as in Fig. 1, one or more independent single bars $g$ of relatively large cross-section, which may have, in cross-section, a circular contour or any other desired practicable contour.

Figure 5:
Figure 6:
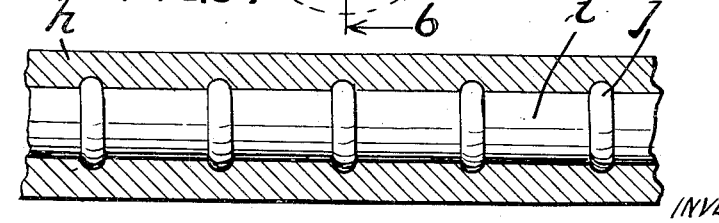
Fig. 6 is a section on the line 6—6 of Fig. 5.

In Fig. 5, part of the special section may be formed from a pipe or tube, comprising a cylindrical section, or, as shown (preferably), two semi-cylindrical sections, having an external contour like that shown in dotted lines and in which is inserted a bar $i$ having circumferential ribs $j$, the tube being then upset to form a plate or strip $h$ the longitudinal central part of which encloses the bar and which has longitudinally extending marginal sections like that shown in Figs. 1, 2 and 3 that are welded to sections $c$ of the main shell. This particular structure will be more fully understood by referring also to Fig. 6, which is a cross-section on the line 6—6 of Fig. 5. The circumferential rib and groove connection between the plate or strip $h$ and the bar $i$ is of importance as affording a mechanical bond between the strip and bar that absolutely insures against possible relative longitudinal movement between these two members.

Figure 7:
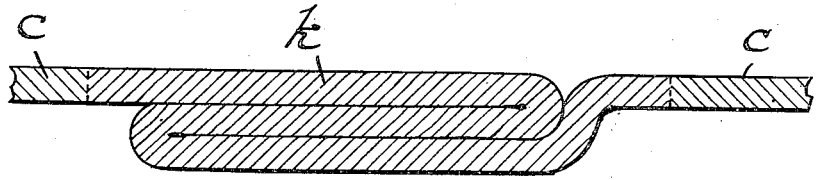
Figs. 7, 8, 9 and 10 are end views of special sections showing additional embodiments of the invention.
Figure 8:
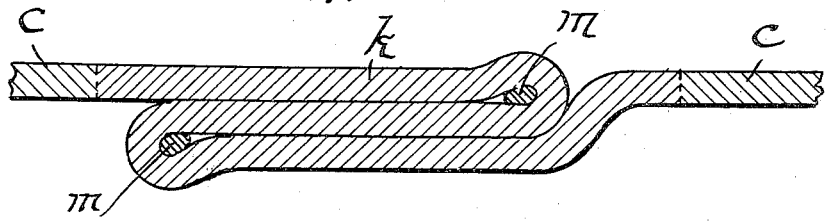

In Figs. 7 and 8 one of the plates of the shell is bent into the convoluted form shown so as to form a special section $k$ having a thickness considerably exceeding, preferably several times, that of the main shell. In this structure one or more of the turns or layers of the convolute effectually resist extension of cracks. The only difference between the structures of Figs. 7 and 8 is that in Fig. 8 reinforcing rods $m$ are inserted into the bends of the convolutes.

Figure 9:
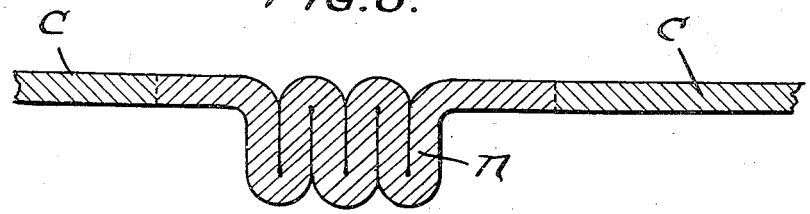
Figure 10:
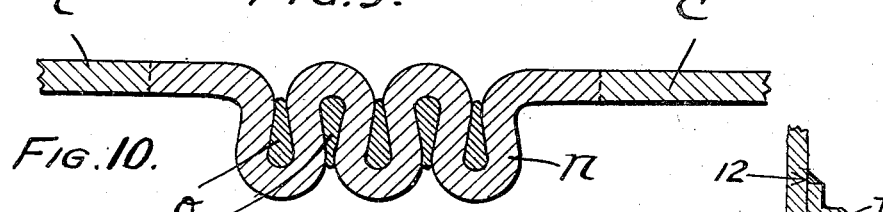

Figs. 9 and 10 are like Figs. 7 and 8 except that the turns of the convolute $n$, instead of extending parallel to the main shell, extend at right angles, or at nearly right angles, thereto. The only difference between the embodiments shown in Figs. 9 and 10 is that, in Fig. 10, reinforcing bars $o$, preferably wedge-shape in cross-section, extend between the layers or turns of the convolute.

Figure 11:
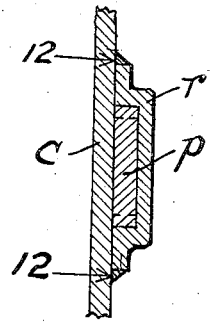
Fig. 11 is a cross-section, and Fig. 12 a face view, of still another embodiment of the invention.
Figure 12:
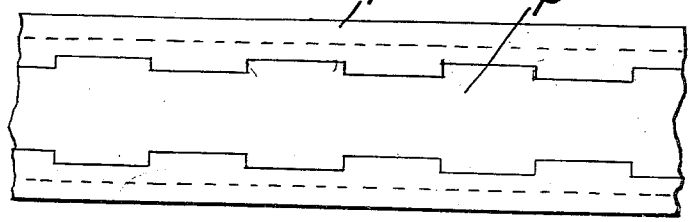

In Figs. 11 and 12 I have illustrated how special sections may be applied to ships of ordinary welded construction. Instead of inserting a special section between two main sections, a special section is applied either to the inside, or to the outside, or to both sides, of the monolithic shell. Each special section comprises a longitudinally extending bar $p$ not fused with the shell $c$ but mechanically bonded thereto by a housing $r$ enclosing the bar $p$ and integrally united by welding to the main section or sections. In this embodiment that part of the monolithic shell to which the bar and housing is applied is the equivalent of the elements $a$ and $a'$, $d$, $f$ and $h$ in Figs. 2 to 6, inclusive. By reason of the complementary notches or serrations shown in Fig. 12, along the longitudinal edges of the bar $p$ and along the opposing inner faces of the housing $r$ (which construction is the equivalent of the rib and groove connection shown in Figs. 5 and 6), and of the integral union between the housing $r$ and the monolithic shell, or shell section, $o$, longitudinal stretch of the section $c$ is with more certainty prevented. Without capacity for longitudinal stretching, transmission through the monolithic shell of any transverse crack is not possible. While this construction is intended more particularly for application to ships of ordinary welded construction that have already been built, it is entirely practicable, and may be of decided practical advantage, to build new ships embodying this construction, since the only difference in principle between this construction and those shown in Figs. 2 to 6, inclusive, is that the monolithic shell structure does not enclose the member or members that are resistant to tearing and shearing stresses.

A feature common to the various embodiments is that when one member or layer of the special section is subjected to shearing or tearing stresses, at least one other member or layer is in tension or compression; and extension of any local crack, especially if multiaxial stresses are present, will be effectually prevented.

My invention is not limited to any particular mode of forming the described special sections. The members, so far as their structure permits, may be cast, forged, rolled, die-formed or extruded into shape, or formed by any convenient and practicable method.

While the invention has been described as especially applicable to welded ships, it is adaptable to certain other monolithic constructions, especially containers comprising sections which are united by welding, and which are subject to multiaxial stresses or to cracking without exhibiting appreciable ductility.

What I claim and desire to protect by Letters Patent is:

1. A ship comprising a shell composed of a number of sections welded together to form a monolithic structure and relatively non-resistant per se to extension of cracks, and a special section including one or more bars, resistant to extension of cracks, applied to the face of the monolithic structure but not fused thereto, and a housing enclosing the bar or bars and secured to one face of the monolithic structure and mechanically bonding said bar or bars to the monolithic shell.

2. A ship as defined in claim 1 in which a longitudinal edge of a bar and that part of the inner face of the housing opposing such edge are provided with complementary interengaging serrations.

3. A ship comprising a shell of metal composed of main monolithic sections relatively non-resistant to extension of cracks and special sections each inserted between and integrally united along its edges with the edges of two main sections, each special section comprising one or more plates having a thickness approximating that of the main sections, and one or more bars extending lengthwise of, enclosed by, and mechanically bonded to, but not fused with, said plate or plates.

4. A ship comprising a shell of metal composed of main monolithic sections relatively non-resistant to extension of cracks and special sections each inserted between and integrally united along its edges with the edges of two main sections, each special section comprising one or more plates the margins of which are welded to the bordering main sections and one or more bars enclosed by, and mechanically bonded to, but not fused with, said plate or plates and extending through the longitudinal central part thereof.

5. A ship comprising a shell of metal composed of main monolithic sections relatively non-resistant to extension of cracks and special sections each comprising a plate inserted between and integrally united along its edges with the edges of two main sections, the plate between its edges being formed into a convolute.

6. A ship comprising a shell of metal composed of main monolithic sections relatively non-resistant to extension of cracks and special sections each comprising a plate inserted between and integrally united along its edges with the edges of two main sections, the plate between its edges being formed into a convolute, and reinforcing members between the bends of the convolute.

7. A ship comprising a shell composed of a multiplicity of main conventional metal sections relatively non-resistant to extension of cracks and spaced-apart special metal sections each inserted between two main sections, adjacent sections being integrally united by welding along their adjacent edges to form a monolithic structure, each special section comprising one or more bars extending lengthwise thereof and enclosed within, and mechanically bonded to, but not fused with, the metal of the special section; the special section, when subjected to any shearing or tearing stresses originating in or extending into one of the bordering main sections being thus adapted to effectually resist the extension of said shearing or tearing stresses across the special section to the other bordering main section.

8. A ship comprising a shell composed of a multiplicity of main conventional metal sections relatively non-resistant to extension of cracks and spaced-apart special metal sections each inserted between two main sections, adjacent sections being integrally united by welding along their adjacent edges to form a monolithic structure, each special section being, along its longitudinal central part, of substantially greater thickness than the thickness along its edges and the thickness of the adjacent main sections, said relatively thick central portions comprising at least three metal layers of which at least the outer layers are integral with the metal of the special section adjacent the edges thereof that are integrally united with contiguous main sections.

9. A ship comprising a shell of metal composed of sections, relatively non-resistant to extension of cracks, welded together to form a monolithic shell structure, one or more bars applied to one face of the monolithic shell but not fused thereto, and a housing enclosing the bar or bars and secured to the same face of the monolithic structure and mechanically bonding said bar or bars to the monolithic shell, thereby affording a resistance to the extension beyond said bars and housing of shearing or tearing stresses originating in or extending along an adjacent part of the monolithic shell.

JOSEPH N. PEW, Jr.

REFERENCES CITED

The following references are of record in the file of this patent:

UNITED STATES PATENTS

| Number | Name | Date |
|---|---|---|
| 1,367,942 | Boyle et al. | Feb. 8, 1921 |
| 2,246,579 | Ewertz | June 24, 1941 |
| 2,393,653 | Pamphilis | Jan. 29, 1946 |

OTHER REFERENCES

Proceedings of Merchant Marine Council, U. S. Coast Guard, volume 1, No. 6, June 1944, pp. 124-5.